(12) United States Patent
Cory

(10) Patent No.: US 6,206,454 B1
(45) Date of Patent: Mar. 27, 2001

(54) SOFT-TOP TYPE VEHICLE COVER

(76) Inventor: Jason R. Cory, 8105 E. 93$^{rd}$ #1006, Tulsa, OK (US) 74133

( * ) Notice: Subject to any disclaimer, the term of this patent is extended or adjusted under 35 U.S.C. 154(b) by 0 days.

(21) Appl. No.: 09/353,953

(22) Filed: Jul. 15, 1999

(51) Int. Cl.$^7$ ................................. B60J 1/08; B60J 10/02
(52) U.S. Cl. .................... 296/146.2; 296/102; 160/273.1
(58) Field of Search ................ 296/100.16, 100.18, 296/102, 107.07, 146.14, 146.16, 210; 49/450, 449; 160/276, 280, 273.1, 290.1, 327

(56) References Cited

U.S. PATENT DOCUMENTS

| | | | |
|---|---|---|---|
| D. 250,330 | * | 11/1978 | Hickman et al. . |
| 1,326,012 | * | 12/1919 | Arnold . |
| 1,716,285 | * | 6/1929 | Szako . |
| 2,463,646 | * | 3/1949 | Schassberger . |
| 3,012,293 | * | 12/1961 | Migneault et al. . |
| 4,104,827 | * | 8/1978 | Opron et al. . |
| 4,600,235 | * | 7/1986 | Frederick et al. . |
| 4,644,699 | * | 2/1987 | Chandler et al. . |
| 4,850,139 | * | 7/1989 | Tiesler . |
| 4,930,835 | * | 6/1990 | Bruce et al. . |
| 5,299,850 | * | 4/1994 | Kaneko et al. . |
| 5,460,423 | * | 10/1995 | Kersting et al. . |
| 5,465,531 | * | 11/1995 | Herrmeyer . |
| 5,560,671 | * | 10/1996 | Ojanen et al. . |
| 5,765,903 | * | 6/1998 | Essig et al. . |
| 5,791,700 | * | 8/1998 | Biro . |
| 5,839,493 | * | 11/1998 | Quansius . |
| 5,979,968 | * | 11/1999 | Essig et al. . |
| 6,036,256 | * | 3/2000 | Hilliard et al. . |
| 6,053,558 | * | 4/2000 | Weldy et al. . |

FOREIGN PATENT DOCUMENTS 6-106986 * 4/1994 (JP) .

* cited by examiner

Primary Examiner—Joseph D. Pape
Assistant Examiner—Scott Carpenter

(57) ABSTRACT

A new soft-top type vehicle cover for preventing theft. The inventive device includes a cover member that is adapted for extending over a passenger compartment of the vehicle between an upper edge of a windshield of the vehicle and a rear of the vehicle. The cover member has a roof portion, a rear portion, and a pair of door portions. Each of the door portions has a door window opening. A plurality of pairs of window tracks are adapted for coupling to vertical sides of the window openings. One pair of window tracks is coupled to the sides of one of the door window openings. Another pair of window tracks is coupled to the sides of another of the door window openings. A plurality of transparent window panes are disposed in a window opening between a pair of window tracks. Each of the window panes has a top, a bottom, and a pair of side ends and is deformable. The window panes in the door window openings slide out of lower ends of the window tracks as they move from a closed position towards an opened position.

11 Claims, 3 Drawing Sheets

SOFT-TOP TYPE VEHICLE COVER

BACKGROUND OF THE INVENTION

1. Field of the Invention

The present invention relates to vehicle covers and more particularly pertains to a new soft-top type vehicle cover for preventing theft.

2. Description of the Prior Art

The use of vehicle covers is known in the prior art. More specifically, vehicle covers heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle covers include U. S. Pat. No. 4,644,699; U.S. Pat. No. 4,850,139; U.S. Pat. No. 4,104,827; U.S. Pat. No. 5,465,531; U.S. Pat. No. Des. 250,330; and U.S. Pat. No. 3,012,293.

While these devices fulfill their respective, particular objectives and requirements, the aforementioned patents do not disclose a new soft-top type vehicle cover. The inventive device includes a cover member that is adapted for extending over a passenger compartment of the vehicle between an upper edge of a windshield of the vehicle and a rear of the vehicle. The cover member has a roof portion, a rear portion, and a pair of door portions. Each of the door portions has a door window opening. A plurality of pairs of window tracks are adapted for coupling to vertical sides of the window openings. One pair of window tracks is coupled to the sides of one of the door window openings. Another pair of window tracks is coupled to the sides of another of the door window openings. A plurality of transparent window panes are disposed in a window opening between a pair of window tracks. Each of the window panes has a top, a bottom, and a pair of side ends and is deformable. The window panes in the door window openings slide out of lower ends of the window tracks as they move from a closed position towards an opened position.

In these respects, the soft-top type vehicle cover according to the present invention substantially departs from the conventional concepts and designs of the prior art, and in so doing provides an apparatus primarily developed for the purpose of preventing theft.

SUMMARY OF THE INVENTION

In view of the foregoing disadvantages inherent in the known types of vehicle covers now present in the prior art, the present invention provides a new soft-top type vehicle cover construction wherein the same can be utilized for preventing theft.

The general purpose of the present invention, which will be described subsequently in greater detail, is to provide a new soft-top type vehicle cover apparatus and method which has many of the advantages of the vehicle covers mentioned heretofore and many novel features that result in a new soft-top type vehicle cover which is not anticipated, rendered obvious, suggested, or even implied by any of the prior art vehicle covers, either alone or in any combination thereof.

To attain this, the present invention generally comprises a cover member that is adapted for extending over a passenger compartment of the vehicle between an upper edge of a windshield of the vehicle and a rear of the vehicle. The cover member has a roof portion, a rear portion, and a pair of door portions. Each of the door portions has a door window opening. A plurality of pairs of window tracks are adapted for coupling to vertical sides of the window openings. One pair of window tracks is coupled to the sides of one of the door window openings. Another pair of window tracks is coupled to the sides of another of the door window openings. A plurality of transparent window panes are disposed in a window opening between a pair of window tracks. Each of the window panes has a top, a bottom, and a pair of side ends and is deformable. The window panes in the door window openings slide out of lower ends of the window tracks as they move from a closed position towards an opened position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new soft-top type vehicle cover apparatus and method which has many of the advantages of the vehicle covers mentioned heretofore and many novel features that result in a new soft-top type vehicle cover which is not anticipated, rendered obvious, suggested, or even implied by any of the prior art vehicle covers, either alone or in any combination thereof.

It is another object of the present invention to provide a new soft-top type vehicle cover which may be easily and efficiently manufactured and marketed.

It is a further object of the present invention to provide a new soft-top type vehicle cover which is of a durable and reliable construction.

An even further object of the present invention is to provide a new soft-top type vehicle cover which is susceptible of a low cost of manufacture with regard to both materials and labor, and which accordingly is then susceptible of low prices of sale to the consuming public, thereby making such soft-top type vehicle cover economically available to the buying public.

Still yet another object of the present invention is to provide a new soft-top type vehicle cover which provides in the apparatuses and methods of the prior art some of the advantages thereof, while simultaneously overcoming some of the disadvantages normally associated therewith.

Still another object of the present invention is to provide a new soft-top type vehicle cover for preventing theft.

Yet another object of the present invention is to provide a new soft-top type vehicle cover which includes a cover member that is adapted for extending over a passenger compartment of the vehicle between an upper edge of a windshield of the vehicle and a rear of the vehicle. The cover member has a roof portion, a rear portion, and a pair of door portions. Each of the door portions has a door window opening. A plurality of pairs of window tracks are adapted for coupling to vertical sides of the window openings. One pair of window tracks is coupled to the sides of one of the door window openings. Another pair of window tracks is coupled to the sides of another of the door window openings. A plurality of transparent window panes are disposed in a window opening between a pair of window tracks. Each of the window panes has a top, a bottom, and a pair of side ends and is deformable. The window panes in the door window openings slide out of lower ends of the window tracks as they move from a closed position towards an opened position.

Still yet another object of the present invention is to provide a new soft-top type vehicle cover that provides greater security than vehicle covers with traditional zipper-fastened closures.

Even still another object of the present invention is to provide a new soft-top type vehicle cover in which the window panes are positionable at various points between an opened and closed position.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
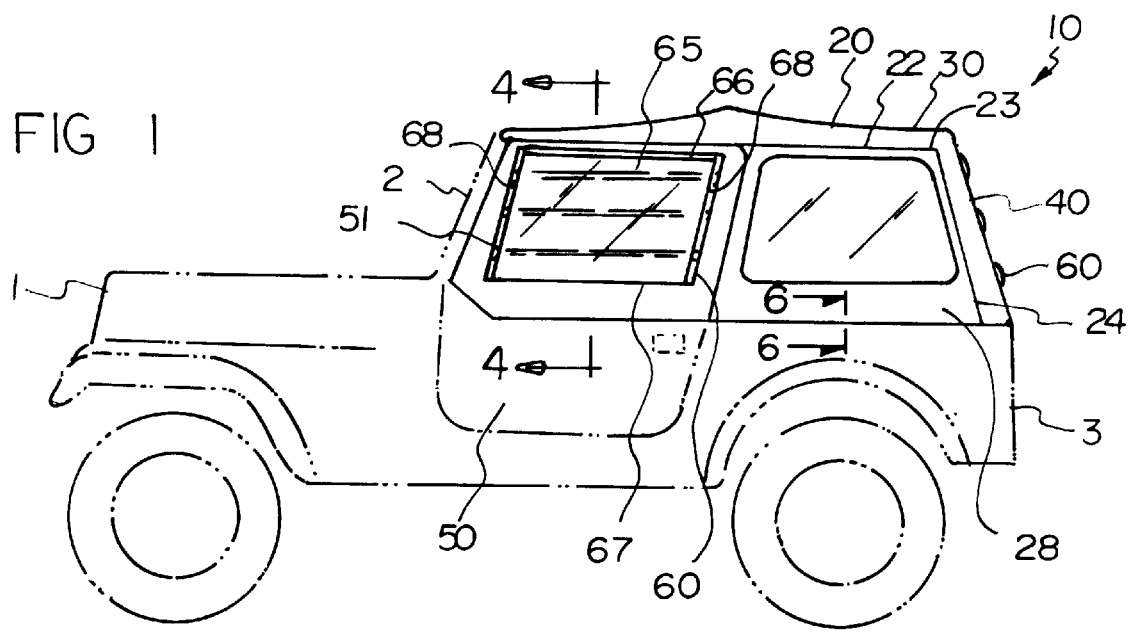
FIG. 1 is a side view of a new soft-top type vehicle cover according to the present invention.
Figure 2:
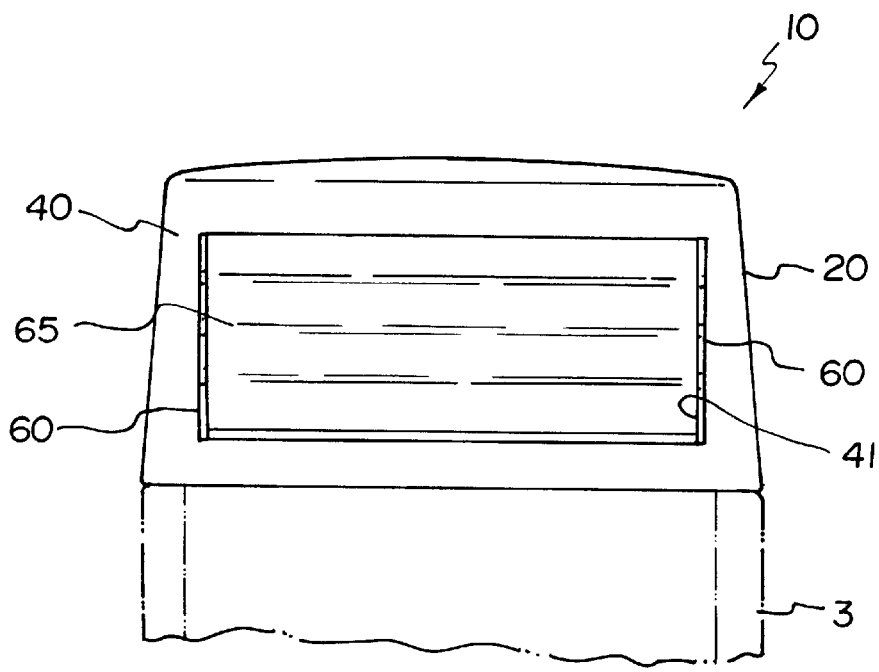
FIG. 2 is a rear view of the present invention.

With reference now to the drawings, and in particular to FIGS. 1 through 7 thereof, a new soft-top type vehicle cover embodying the principles and concepts of the present invention and generally designated by the reference numeral 10 will be described.

As best illustrated in FIGS. 1 through 7, the soft-top type vehicle cover 10 comprises a cover member 20 that is adapted for extending over a passenger compartment of the vehicle 1 between an upper edge of a windshield 2 of a vehicle 1 and a rear 3 of the vehicle 1. The cover member 20 has a roof portion 30, a rear portion 40, and a pair of door portions 50. The roof portion 30 is detachably coupled to the windshield 2 of the vehicle 1 and extends rearwardly over the passenger compartment. The rear portion 40 extends between the roof portion 30 and the rear 3 of the vehicle 1 and is detachably coupled to an outer surface of the rear 3 of the vehicle 1 such as by a tongue 21 inserted behind a lip 4. A framework (not shown) internally supports the cover member 20.

Each of the door portions 50 has a door window opening 51. The cover member 20 also has a rear window opening 41. A plurality of pairs of window tracks 60 are adapted for coupling to vertical sides of the window openings 41,51. One pair of window tracks 60 is coupled to the sides of one of the door window openings 51. Another pair of window tracks 60 is coupled to the sides of another of the door window openings 51. Another pair of window tracks 60 is coupled to the sides of the rear window opening 41.

A plurality of transparent window panes 65 are disposed in a window opening between a pair of window tracks 60. Each of the window panes 65 has a top 66, a bottom 67, and a pair of side ends 68 and is deformable. The window panes 65 are deformable.

Each of the window panes 65 is positionable between a closed and an opened position. The window openings 41,51 are substantially covered when the window panes 65 are in the closed position. The window openings 41,51 are substantially opened when the window panes 65 are in the opened position. The window panes 65 in the door window openings 51 slide out of lower ends of the window tracks 60 as they move from a closed position towards an opened position. Preferably, a bar (not shown) extends horizontally across an inner surface of each of the door portions 50 below the door window openings 51. The window panes 65 are adapted to fold under the bar when in the opened position for more compact storage. Ideally, each of the bottoms 67 of the window panes 65 positioned in the door window openings 51 is coupled to a respective door window opening 51. Thus, the bottom 67 of a window pane 65 remains stationary and the window pane 65 folds over itself as it slides out of the window tracks 60 towards an opened position. The fold of the window pane 65 is tucked between the bar and the door portion 50.

Figure 7:
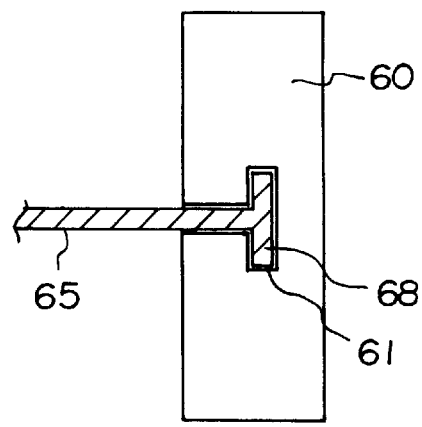
FIG. 7 is a cross sectional view of the present invention taken from line 7—7 of FIG. 5.

Preferably, as shown in FIG. 7, each of the side ends 68 of the window panes 65 are generally T-shaped. In such an embodiment, each of the window tracks 60 has a generally C-shaped transverse cross-section and has a channel 61 therein for receiving the side ends 68 of the window panes 65. Also preferably, each of the window tracks 60 has at least one roller 63 extending into the channel 61 for facilitating sliding of the side end 68 of the window pane 65 through the channel 61.

Preferably, each of the window tracks 60 has a plurality of apertures 62 therein that extend into a rear surface of the channel 61. The apertures 62 are spaced apart.

Each of the tops 66 of the window panes 65 positioned in the door window openings 51 has a squeeze actuator 70 centrally located thereon and a pair of rods 71. One of the rods 71 extends from the squeeze actuator 70 into an aperture of one of the window tracks 60. Another of the rods 71 extends from the squeeze actuator 70 into an aperture of another of the window tracks 60. The rods 71 extend into the apertures 62 of the window tracks 60 to restrict vertical movement of the top 66 of the window pane between the opened and closed positions. Squeezing the squeeze actuator 70 retracts the rods 71 towards the squeeze actuator 70 thereby permitting vertical positioning of the top 66 of the window pane. Ideally, the squeeze actuator 70s of the window panes 65 positioned in the door window openings 51 is positioned towards a passenger compartment of the vehicle 1.

Also preferably. The top 66 of the window pane positioned in the rear window opening 41s being coupled to the rear window opening 41. The bottom 67 of the window pane positioned in the rear window opening 41 has a squeeze actuator 70 centrally located thereon and a pair of rods 71. One of the rods 7 1 extends from the squeeze actuator 70 into an aperture of one of the window tracks 60. Another of the rods 71 extends from the squeeze actuator 70 into an aperture of another of the window tracks 60. The rods 71 restrict vertical movement of the bottom 67 of the window pane between the opened and closed positions. Squeezing the squeeze actuator 70 retracts the rods 71 towards the squeeze actuator 70 thereby permitting vertical positioning of the bottom 67 of the window pane. Ideally, the squeeze actuator 70 of the window pane positioned in the rear window opening 41 is positioned away from the passenger compartment of the vehicle 1 and includes a locking mechanism.

Figure 4:
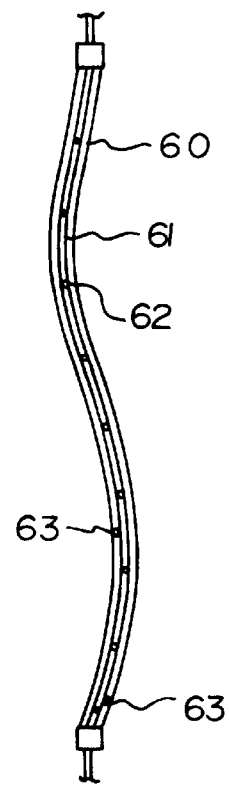
FIG. 4 is a cross-sectional view of a track of the present invention taken from line 4—4 of FIG. 1.
Figure 5:
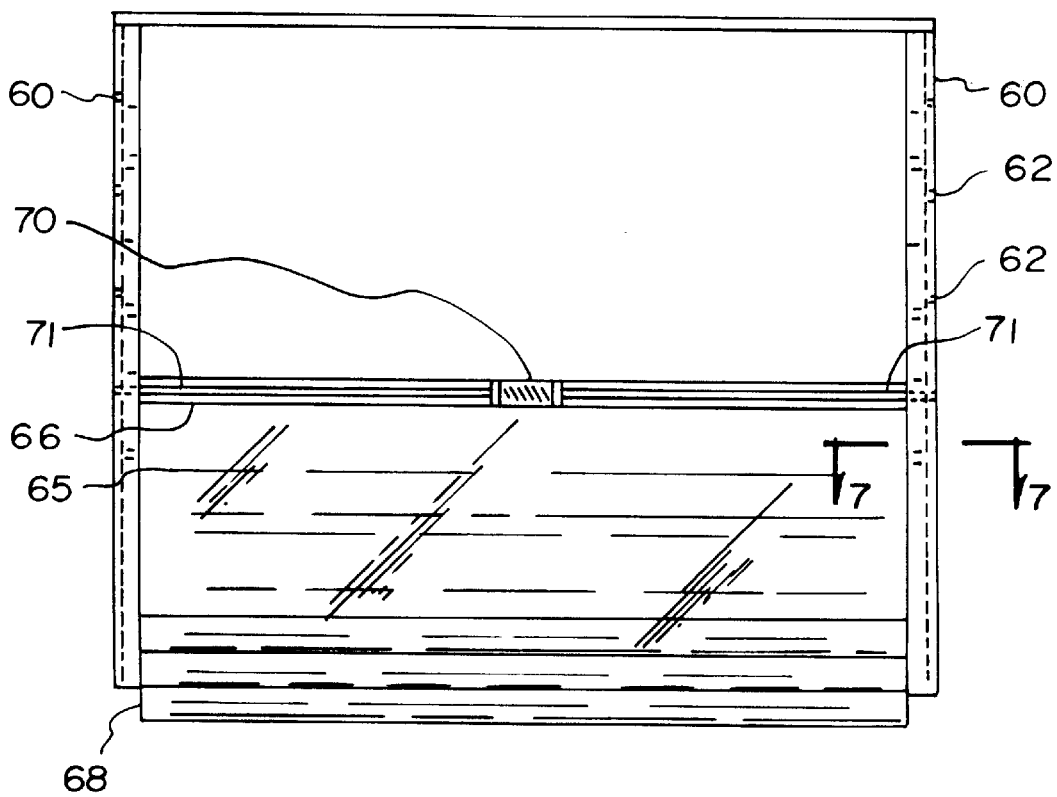
FIG. 5 is a side view of a window pane and window tracks of the present invention.

Preferably, as shown in FIG. 4, each of the window tracks 60 has a serpentine shape along its longitudinal axis for helping the window pane 65 slide out of the window tracks 60 as the window pane moves from a closed position toward an opened position. The serpentine shape directs the window pane 65 away from the door portion 50.

Figure 6:
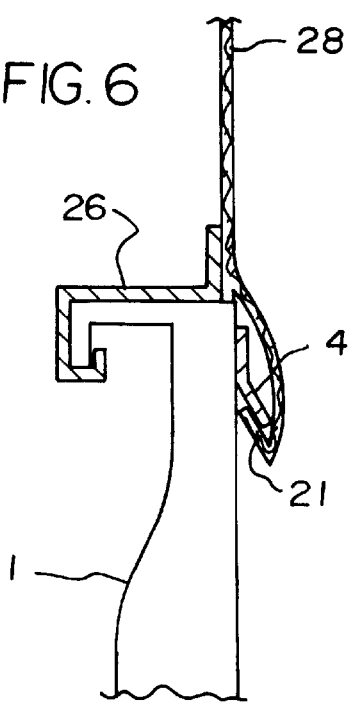
FIG. 6 is a cross sectional view of the present invention taken from line 6—6 of FIG. 1.

Preferably, first and second rear clip members (not shown) are coupled to the rear portion 40 of the cover member 20. The first clip member extends along a lower edge of the rear portion 40 of the cover member 20 between one of the quarter panel openings 22 and a rear gate of the vehicle 1. The second rear clip member extends along a lower edge of the rear portion 40 of the cover member 20 between another of the quarter panel openings 22 and the rear gate of the vehicle 1. The rear clip members are detachably coupled to an inside surface of the vehicle 1 to help prevent detaching of the cover member 20 from the vehicle 1. As shown in FIG. 6, once the cover member 20 is coupled to the outer surface of the vehicle 1, a clip member is coupled to the inner surface of the vehicle 1 to prevent exterior disengagement of the cover member 20 from the outer surface. The cover member 20 can only be disengaged after the clips are disengaged from the inner surface of the vehicle 1.

In the preferred embodiment, the cover member 20 has a pair of quarter panel openings 22. The cover member 20 also has first and second quarter panel portions 28 that are adapted for insertion in the quarter panel openings 22 of the cover member 20. The quarter panel portions 28 are removably coupled to the roof portion 30 and the rear portion 40 of the cover member 20 and are detachably coupled to an outer surface of the vehicle I such as by a tongue 21 inserted behind a lip 4 as well as to the framework along the door portions 50.

The roof portion 30 of the cover member 20 has a pair of first slide tracks 23. One of the first slide tracks 23 vertically extends along one of the quarter panel openings 22. Another of the first slide tracks 23 vertically extends along another of the quarter panel openings 22. Upper edges of the quarter panel portions 28 are slidably insertable in the first slide tracks 23. The rear portion 40 of the cover member 20 has a pair of second slide tracks 24. One of the second slide tracks 24 horizontally extends along one of the quarter panel openings 22. Another of the second slide tracks 24 horizontally extends along another of the quarter panel openings 22. Rear edges of the quarter panel portions 28 are slidably insertable in the second slide tracks 24. Ideally, each of the slide tracks 23,24 has a generally C-shaped transverse cross-section and has a channel (not shown) therein for receiving the quarter panel portions 28. To insert a quarter panel portion 28 into a quarter panel opening 22, an upper edge of the quarter panel portion 28 is inserted in a lower portion of the second slide track 24 and slid towards the first slide track 23. The upper edge of the quarter panel portion 28 is then inserted in the first slide track 23 and slid towards a door portion 50.

First and second quarter panel clip members 26 are coupled to the quarter panel portions 28 of the cover member 20. The first quarter panel clip member 26 extends along a lower edge of one of the quarter panel portions 28. The second quarter panel clip member 26 extends along a lower edge of another of the quarter panel portions 28. The quarter panel clip members 26 are detachably coupled to an inside surface of the vehicle 1 to help prevent detaching of the quarter panel portions 28 from the vehicle 1.

Figure 3:
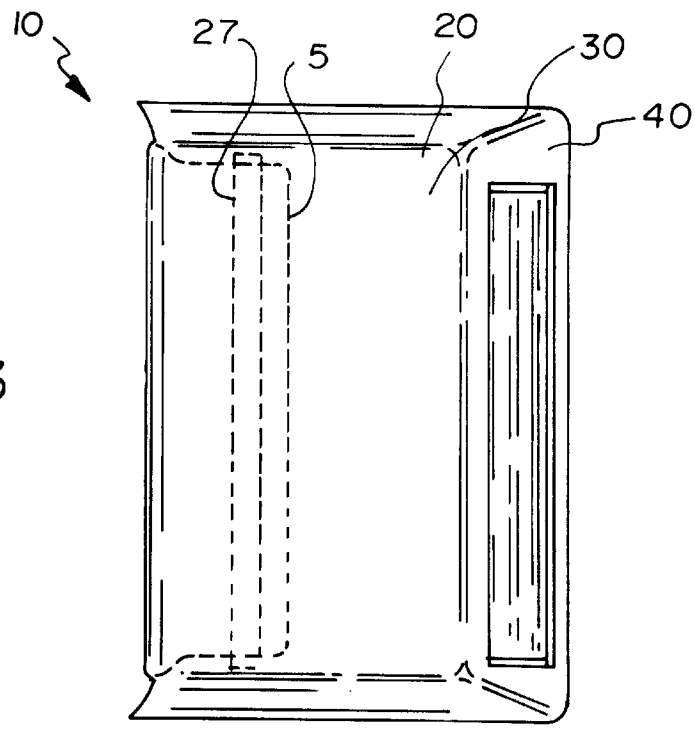
FIG. 3 is a top view of the present invention.

Preferably, as shown in FIG. 3, a strap 27 extends across the roof portion 30 of the cover member 20 substantially perpendicular to a longitudinal axis of the vehicle 1. The strap 27 is adapted to hold a forward portion 5 of the roof portion 30 in a folded orientation under a back portion of the roof portion 30 when the roof portion 30 is detached from the windshield 2 of the vehicle 1. The forward portion is simply detached from the windshield 2 and folded under the strap 27.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A soft-top type vehicle cover with anti-theft features for covering a passenger compartment of a Jeep type vehicle, the vehicle cover comprising:

a cover member being adapted for extending over a passenger compartment of the vehicle between an upper edge of a windshield of a vehicle and a rear of the vehicle;

said cover member having a roof portion, a rear portion, and a pair of door portions, said roof portion being detachably coupled to the windshield of the vehicle and extending rearwardly over said passenger compartment, said rear portion extending between said roof portion and the rear of the vehicle and being detachably coupled to an outer surface of the rear of the vehicle;

each of said door portions having a door window opening;

a plurality of pairs of window tracks being adapted for coupling to vertical sides of said window openings, one pair of window tracks being coupled to said sides of one of said door window openings, another pair of window tracks being coupled to said sides of another of said door window openings;

a plurality of transparent window panes, each of said window panes being disposed in a window opening between a pair of window tracks, each of said window panes having a top, a bottom, and a pair of side ends, said window panes being deformable;

each of said window panes being positionable between a closed and an opened position, said window openings being substantially covered when said window panes are in said closed position, said window openings being substantially opened when said window panes are in said opened position; and said window panes in said door window openings sliding out of lower ends of said window tracks as they move from said closed position towards said opened position.

2. The vehicle cover of claim 1, wherein each of said window tracks has a plurality of apertures therein being extended into a rear surface of said channel and being spaced apart, each of said tops of said window panes positioned in said door window openings having a squeeze actuator centrally located thereon and a pair of rods, one of said rods being extended from said squeeze actuator into an aperture of one of said window tracks, another of said rods being extended from said squeeze actuator into an aperture of another of said window tracks, said rods restricting vertical movement of said top of said window pane between said opened and closed positions, wherein squeezing said squeeze actuator retracts said rods towards said squeeze actuator thereby permitting vertical positioning of said top of said window pane.

3. The vehicle cover of claim 2, wherein said squeeze actuators of said window panes positioned in said door window openings is positioned towards a passenger compartment of said vehicle.

4. The vehicle cover of claim 1, wherein said cover member has a rear window opening, a pair of window tracks being coupled to said sides of said rear window opening, a window pane being disposed in said rear window opening between said pair of window tracks.

5. The vehicle cover of claim 4, wherein each of said window tracks in said rear window opening has a plurality of apertures therein being extended into a rear surface of said channel, said apertures being spaced apart, said bottom of said window pane positioned in said rear window opening having a squeeze actuator centrally located thereon and a pair of rods, one of said rods being extended from said squeeze actuator into an aperture of one of said window tracks, another of said rods being extended from said squeeze actuator into an aperture of another of said window tracks, said rods restricting vertical movement of said bottom of said window pane between said opened and closed positions, wherein squeezing said squeeze actuator retracts said rods towards said squeeze actuator thereby permitting vertical positioning of said bottom of said window pane.

6. The vehicle cover of claim 1, wherein each of said window tracks has a serpentine shape along a longitudinal axis thereof for helping said window pane slide out of said window tracks as said window pane moves from a closed position toward an opened position.

7. The vehicle cover of claim 1, further comprising at least one clip member being coupled to said cover member, said clip member being extended along a lower edge of said cover member, said clip member being detachably coupled to an inside surface of the vehicle for helping prevent detaching of said cover member from the vehicle.

8. The vehicle cover of claim 1, wherein said cover member has a pair of quarter panel openings, said cover member having first and second quarter panel portions being adapted for insertion in said quarter panel openings of said cover member, said quarter panel portions being removably coupled to said roof portion and said rear portion of said cover member and being detachably coupled to an outer surface of the vehicle.

9. The vehicle cover of claim 8, wherein said roof portion of said cover member has a pair of first slide tracks, one of said first slide tracks being vertically extended along one of said quarter panel openings, another of said first slide tracks being vertically extended along another of said quarter panel openings, upper edges of said quarter panel portions being slidably insertable in said first slide tracks, said rear portion of said cover member having a pair of second slide tracks, one of said second slide tracks being horizontally extended along one of said quarter panel openings, another of said second slide tracks being horizontally extended along another of said quarter panel openings, rear edges of said quarter panel portions being slidably insertable in said second slide tracks.

10. The vehicle cover of claim 1, further comprising a strap being extended across said roof portion of said cover member substantially perpendicular to a longitudinal axis of the vehicle, said strap being adapted for holding a forward portion of said roof portion in a folded orientation under a back portion of said roof portion when said roof portion is detached from the windshield of the vehicle.

11. A soft-top type vehicle cover with anti-theft features for covering a passenger compartment of a Jeep type vehicle, the vehicle cover comprising:

a cover member being adapted for extending over a passenger compartment of the vehicle between an upper edge of a windshield of a vehicle and a rear of the vehicle;

said cover member having a roof portion, a rear portion, and a pair of door portions, said roof portion being detachably coupled to the windshield of the vehicle and extending rearwardly over said passenger compartment, said rear portion extending between said roof portion and the rear of the vehicle and being detachably coupled to an outer surface of the rear of the vehicle;

each of said door portions having a door window opening;

said cover member having a rear window opening;

a plurality of pairs of window tracks being adapted for coupling to vertical sides of said window openings, one pair of window tracks being coupled to said sides of one of said door window openings, another pair of window tracks being coupled to said sides of another of said door window openings, another pair of window tracks being coupled to said sides of said rear window opening;

a plurality of transparent window panes, each of said window panes being disposed in a window opening between a pair of window tracks, each of said window panes having a top, a bottom, and a pair of side ends, each of said side ends of said window panes being generally T-shaped, said window panes being deformable;

each of said window tracks having a generally C-shaped transverse cross-section and having a channel therein for receiving said side ends of said window panes;

each of said window panes being positionable between a closed and an opened position, said window openings being substantially covered when said window panes are in said closed position, said window openings being substantially opened when said window panes are in said opened position;

said window panes in said door window openings sliding out of lower ends of said window tracks as they move from said closed position towards said opened position;

each of said window tracks having a plurality of apertures therein being extended into a rear surface of said channel, said apertures being spaced apart;

each of said tops of said window panes positioned in said door window openings having a squeeze actuator centrally located thereon and a pair of rods, one of said rods being extended from said squeeze actuator into an aperture of one of said window tracks, another of said rods being extended from said squeeze actuator into an aperture of another of said window tracks, said rods restricting vertical movement of said top of said window pane between said opened and closed positions, wherein squeezing said squeeze actuator retracts said rods towards said squeeze actuator thereby permitting vertical positioning of said top of said window pane;

wherein said squeeze actuators of said window panes positioned in said door window openings is positioned towards a passenger compartment of said vehicle;

said bottom of said window pane positioned in said rear window opening having a squeeze actuator centrally located thereon and a pair of rods, one of said rods being extended from said squeeze actuator into an aperture of one of said window tracks, another of said rods being extended from said squeeze actuator into an aperture of another of said window tracks, said rods restricting vertical movement of said bottom of said window pane between said opened and closed positions, wherein squeezing said squeeze actuator retracts said rods towards said squeeze actuator thereby permitting vertical positioning of said bottom of said window pane;

each of said window tracks having a serpentine shape along a longitudinal axis thereof for helping said window pane slide out of said window tracks as said window pane moves from a closed position toward an opened position; at least one clip member being coupled to said cover member, said clip member being extended along a lower edge of said cover member, said clip member being detachably coupled to an inside surface of the vehicle for helping prevent detaching of said cover member from the vehicle;

said cover member having a pair of quarter panel openings;

said cover member having first and second quarter panel portions being adapted for insertion in said quarter panel openings of said cover member, said quarter panel portions being removably coupled to said roof portion and said rear portion of said cover member and being detachably coupled to an outer surface of the vehicle;

said roof portion of said cover member having a pair of first slide tracks, one of said first slide tracks being vertically extended along one of said quarter panel openings, another of said first slide tracks being vertically extended along another of said quarter panel openings, upper edges of said quarter panel portions being slidably insertable in said first slide tracks;

said rear portion of said cover member having a pair of second slide tracks, one of said second slide tracks being horizontally extended along one of said quarter panel openings, another of said second slide tracks being horizontally extended along another of said quarter panel openings, rear edges of said quarter panel portions being slidably insertable in said second slide tracks;

each of said slide tracks having a generally C-shaped transverse cross-section and having a channel therein for receiving said quarter panel portions;

first and second quarter panel clip members being coupled to said quarter panel portions of said cover member, said first quarter panel clip member being extended along a lower edge of one of said quarter panel portions, said second quarter panel clip member being extended along a lower edge of another of said quarter panel portions, said quarter panel clip members being detachably coupled to an inside surface of the vehicle for helping prevent detaching of said quarter panel portions from the vehicle; and a strap being extended across said roof portion of said cover member substantially perpendicular to a longitudinal axis of the vehicle, said strap being adapted for holding a forward portion of said roof portion in a folded orientation under a back portion of said roof portion when said roof portion is detached from the windshield of the vehicle.

* * * * *